March 10, 1953  N. E. COLEGROVE  2,631,265
MOTOR SPEED CONTROLLER
Filed Oct. 12, 1948
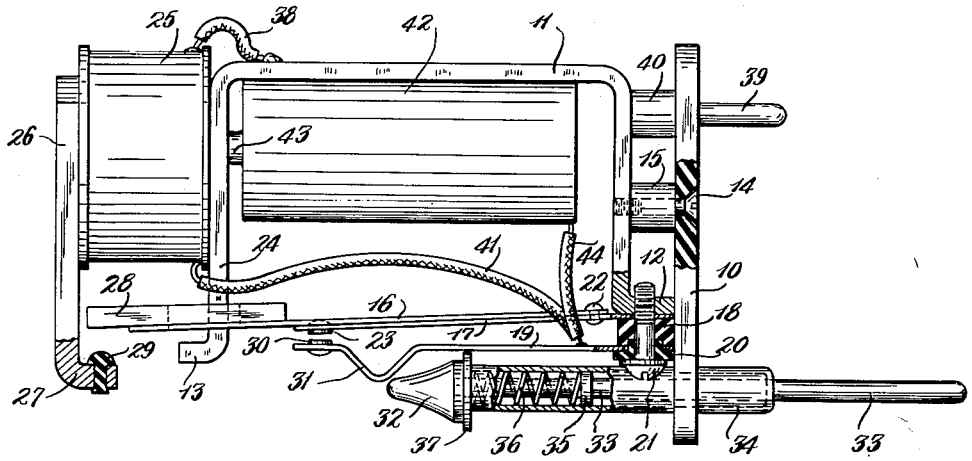
FIG. 1
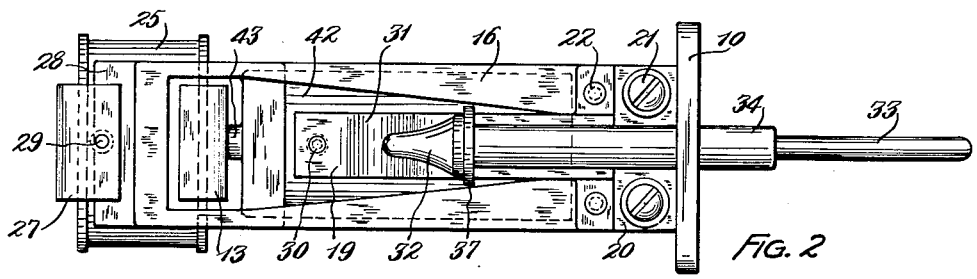
FIG. 2
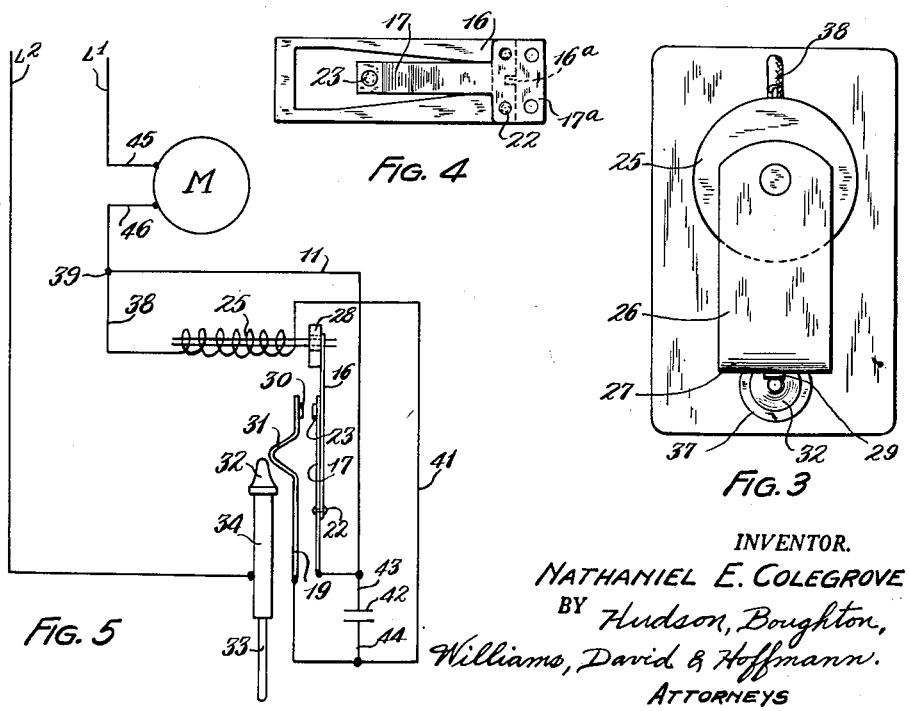
FIG. 4
FIG. 3
FIG. 5
INVENTOR.
NATHANIEL E. COLEGROVE
BY Hudson, Boughton,
Williams, David & Hoffmann.
ATTORNEYS Patented Mar. 10, 1953

2,631,265

UNITED STATES PATENT OFFICE 2,631,265

MOTOR SPEED CONTROLLER

Nathaniel E. Colegrove, Cleveland, Ohio, assignor to White Sewing Machine Corporation, Cleveland, Ohio, a corporation of Delaware Application October 12, 1948, Serial No. 54,124

17 Claims. (Cl. 318—346)

This invention relates to a speed controller or regulator for an electric motor and, more particularly, to an improved device for controlling the energization of an electric motor in a manner to enable the latter to be operated at any desired speed within a continuous range extending from zero to and including the maximum speed at which the motor is designed to operate.

One commonly employed mode of controlling the speeds of electric motors is to utilize control elements which vary the voltage input to the motor. This type of speed regulator or controller has the disadvantage that the motor, when operating at low speed, is energized at relatively low voltage and, hence, the motor at such low speeds does not develop its maximum power. In the operation of certain apparatuses or devices at low speed it is desirable and requisite for the motor driving the apparatus or device to develop its maximum power at low speed if the apparatus or device is to function at full efficiency. In fact, many devices or apparatuses require greater power for efficient operation at low speeds than they do when operating at high speeds, since, in the latter case, the momentum of the parts facilitates the operation of the apparatuses or devices. An excellent illustration of the advantage of an electric motor developing full power at low speed is found in connection with the electric drive motor for a sewing machine. For example, the operator of a sewing machine often desires to run that machine at low speed and this situation frequently exists when the sewing is being performed on relatively thick materials or upon a number of layers of material, so that maximum power is required to pass the needle of the machine through the material. When the electric drive motor of the sewing machine is controlled by a speed regulator or controller of the type which carries the voltage input to the motor, the latter will not develop its full power at low speeds and hence the machine does not function efficiently at such speeds since, as noted above, the low speed operation of the machine is generally at a time when maximum power is required. While a sewing machine motor has been mentioned by way of illustration, it will be apparent that a similar problem arises in connection with drive motors for apparatuses or devices of other types and, hence, reference to sewing machine motors is merely illustrative and is not to be construed as a limitation.

An object of this invention is, therefore, to provide a speed regulator or controller for an electric motor such that the motor is energized for rotation at any desired speed at full line voltage, so that the motor has substantially the same power at all speeds.

Electrical motors have also had their speeds controlled or regulated by centrifugal governor type devices. Such controllers or regulators depend for operation upon the acceleration or deceleration of the motor controlled and, hence, are subject to inertia and other effects which minimize their accuracy and efficiency.

Another object of this invention is, therefore, to provide a speed regulator or controller for an electric motor which is accurate and efficient, does not depend for operation upon acceleration or deceleration of the motor, is relatively inexpensive to construct and which may be readily employed with conventional motors without altering their construction, since the motor windings are not employed to aid in effecting the speed controlling function.

A more specific object of the invention is to provide a speed controller or regulator for an electric motor such that an impedance in the device is in series with the energizing circuit of the motor and is periodically short-circuited so that the motor is energized by impulses of electrical power at full line voltage, the speed of the motor being controlled by variation of the duration of the impulses under the control of the operator, maximum speed of the motor being achieved when the interval between the impulses becomes zero; that is, when the impedance is continuously short-circuited.

A still more specific object of the invention is to provide a speed controller or regulator for an electric motor of the type defined in the preceding object and in which the said impedance is the coil of an electromagnet, the armature of which vibrates one contact relative to a second contact with the said contacts being connected in parallel with the coil of the electromagnet so as to short-circuit the latter when the contacts engage, the second-mentioned contact being adjustable to vary the duration of the engagement of the contacts thereby selecting the speed of the motor.

Another object of the invention is to provide an improved speed controller or regulator for an electric motor as defined in the preceding object and in which the means for adjusting the adjustable contact cooperates with the latter to provide an "off-on" switch for the motor which is controlled.

The invention further resides in certain novel features of construction and combination and arrangements of parts, and further objects and advantages thereof will be apparent to those skilled in the art to which it pertains from the following description of the present preferred embodiment thereof described with reference to the accompanying drawing, in which similar reference characters represent corresponding parts in the several views, and in which:

Fig. 1 is a side elevational view of a circuit controller or regulator constructed in accordance with this invention, portions of certain parts being broken away to more clearly reveal the construction;

Fig. 2 is a bottom view of the controller or regulator illustrated in Fig. 1;

Fig. 3 is an end elevational view of the controller or regulator illustrated in Figs. 1 and 2, showing the left-hand end of the controller as viewed in those figures;

Fig. 4 is a detached plan view, on a reduced scale, of a sub-assembly of the illustrated controller or regulator comprising the armature, the vibrating contact, and the vibration damping member; and Fig. 5 is a schematic wiring diagram of the circuit of the controller or regulator as applied to a motor for controlling the speed of the latter.

As shown in the drawing, the present preferred embodiment of the motor speed controller or regulator comprises a mounting plate 10, which is preferably formed of insulating material, and provides a convenient means to mount the device. Mounted upon the plate 10 is a substantially U-shaped member 11, formed of magnetically permeable material, such as iron or the like. This member has its ends 12 and 13 bent outwardly at substantially right angles with respect to its legs and the end portion 12 engages the mounting plate 10 so that the member 11 extends at substantially right angles with respect to the plate 10. The member 11 is secured to the plate 10 by a machine screw, or the like, 14 which passes through the plate 10 and has its inner end threadably received in a tapped opening in the adjacent leg of the U-shaped member 11, a bushing 15 being provided about the screw 14 intermediate the member 11 and the plate 10.

The lower surface of the end portion 12 of the U-shaped member 11 serves as a mounting support for a movable armature and contact assembly. As shown in the drawing, this assembly comprises a resilient, elongated armature member 16, which is preferably a leaf spring formed of magnetically permeable material; a resilient contact carrying member 17; an insulating bushing or plate 18; a flexible contact carrying arm or member 19; and a second insulating bushing or plate 20 This assembly is preferably mounted and secured together by mounting screws 21 in the manner shown in Fig. 1, from which it will be seen that the mounting screws pass through aligned openings in the insulating plate 20, flexible contact arm or member 19, insulating plate 18, and resilient member 16 in that order, the inner ends of the mounting screws being threaded into tapped openings in the portion 12 of the U-shaped member. It will be observed that the openings in member 19 for the mounting screws are of considerably larger diameter than the latter to provide for insulation between this member and the screws. As illustrated, this insulation is effected by bosses on the insulating member 20 which surround the screws and extend, with a clearance, through the openings in the member 19. It will of course be appreciated that instead of employing such integral bosses, the desired insulation may be effected by separate sleeves or bushings of insulating material. The rear portion of the armature member 16 is secured to the enlarged rear portion 17a of the member 17 by rivets or the like 22 so that the armature forms a part of the assembly supported by the screws 21. It is evident that the members 11 and 17 are in electrical conductive contact while the arm 19 is electrically insulated from both the members 11 and 17.

In the present preferred embodiment the armature member 16 is shown, see Fig. 4, as comprising a plate-like leaf spring of magnetically permeable material having a substantially rectangular configuration and provided with a cut-out portion or opening, which is substantially rectangular adjacent the free end of the member and tapers towards the other end of the member which is preferably closed. The inner closed end of the armature 16 is preferably provided with a notch or recess 16a the dimensions of which are selected so as to provide the desired degree of flexibility of the member. The contact carrying member 17 has, as previously stated, an enlarged rear portion, designated 17a which is substantially rectangular and is provided with openings for the mounting screws 21 and for the rivets 22 which secure the members 16 and 17 together. As shown in Fig. 4, the contact carrying portion of the member 17 is elongated and is of lesser width than the member 16 thus providing a tongue-like portion extending substantially centrally of the width of tapered portion of the central opening in the armature member 16 and terminating an appreciable distance from the outer edge of the opening. Secured to the member 17 adjacent its outer free end is an electrical contact 23.

While the member 16 and the contact arm or member 17 have been shown and described as two separate pieces of material which are secured together, it will be apparent that they may be formed from a single piece of spring-like material, the portions of the central area of which have been removed to provide a tongue-like contact carrying portion intermediate the sides of the opening. Moreover, it is not essential that the inner end of the armature member 16 be closed as shown nor that the sides of the member, adjacent the central opening taper as shown. Furthermore, it is not necessary that the members 16 and 17 be resilient through their entire lengths, but may be formed of relatively rigid material having integral or separate portions of sufficient flexibility to permit vibration of the members The leg 24 of the U-shaped member 11 forms a support for an electromagnet 25 which is so mounted thereon that the leg 24 and its end portion 13 cooperate with the core of the electromagnet to form one pole piece for the latter. Preferably, the leg 24 and the portion 13 of the U-shaped member extend through the rectangular portion of the opening in the armature member 16, as shown in Figs. 1 and 2, so that the armature 16 surrounds the leg 24 adjacent its lower end. The electromagnet 25 is provided with a second pole piece 26, which has its lower or free end 27 bent inwardly toward the adjacent end portion 13 of the U-shaped member 11, the end portion 27 being a greater distance from the electromagnet than the portion 13 so that the field extending between the ends of the pole pieces, when the electromagnet is energized, is so directed as to have a maximum effect in attracting the armature 16, which due to its cantilever-type mounting tends to move in an arc. The movement of the armature in response to energization of the electromagnet causes the member 17 to flex, since these members are secured together, and the resiliency of the members returns them to their initial positions, substantially as shown in Fig. 1, when the electromagnet is denergized.

Secured to the armature member 16 adjacent its outer free end is a member 28 which is preferably rectangular and has a substantially rectangular central opening substantially aligned with the corresponding portion of the opening in the member 16 so as to likewise surround the leg 24 of the electromagnet adjacent its lower end. This member 28 is formed from an electrically-conductive, non-magnetic material, for example zinc or the like, and hence forms, in effect, a single turn, closed circuit, low resistance path for currents of electricity induced therein by changes in the magnetic flux in the leg 24 as the electromagnet is repeatedly energized and deenergized as hereinafter described. As is well known, the currents induced in the member 28 are such as to oppose the movement of the latter and hence of the members 16 and 17 thereby damping the movements of these members in response to energization and deenergization of the electromagnet. This prevents the spring-like armature member 16 and the contact member 17 from reaching their natural frequency of vibration, it being understood that frequency of their vibration is also governed by the dimensions of these members, of the previously mentioned slot or recess 16a, and by the size of the coil of the electromagnet. The dimensions and characteristics of the parts are preferably so selected that the frequency of vibration of the armature 16 and member 17 is different from that of the periodicity of the electrical energization of the electromagnet 25. By way of example, devices constructed as shown and described have been found to have a frequency of vibration of the armature 16 and contact member 17 in the order of 600 to 900 vibrations per minute when the electromagnet was energized with 60 cycle alternating current, the frequency of vibration being readily controlled by suitable selection of the size of the coil of the electromagnet, the size and weight of the member 28 and/or the size and resiliency of the members 16 and 17.

Preferably the portion 27 of the pole piece 26 is provided with a stop or bumper 29, which may be formed of rubber, leather, or the like, and is adapted to be engaged by the member 28 and thereby limit the travel of the latter and of the members 16 and 17.

The electrical contact surface 23 on the member 17 is adapted to engage a contact surface or portion 30 carried by the outer end of the arm or member 19, as hereinafter described. In order to control the duration of this engagement, the arm or member 19, intermediate its point of mounting and its contact 30, is provided with a cam-shaped portion or surface 31 which, in the instant case, is shown as comprising a somewhat V-shaped bend in the member. This cam-shaped portion of the member 19 is adapted to be engaged and moved by a cooperating cam surface under the control of the operator, thereby varying the separation between the contacts 23 and 30 when the latter are in their normal positions and, hence, varying the duration of their engagement when the contact 23 is vibrated by operation of the electromagnet 25. The operator controlled cam surface is, in the present instance, provided by a somewhat conically-shaped member 32 integral with, or secured to, the outer end of a push rod 33 which is slidably supported in a cylindrical guide 34 passing through an opening in the mounting plate 10, the guide 34 being secured to the mounting plate in any desired manner.

The rod 33 extends beyond the guide 34 and is adapted to be actuated by the operator of the device by the latter pushing inwardly thereon. This may be effected in any desired manner but, when the device is to be employed with a sewing machine or the like, it is convenient to provide an actuating member or lever for cooperation with the outer end of the rod 33 and which may be operated by the knee, foot, or hand of the operator. Consequently, when reference is made hereinafter and in the subjoined claims to "manual" operation of this member, it is to be construed as covering actuation by the operator whether by the hand, arm, foot, leg or other part of the body. Since actuating members of the type just mentioned are well known and widely employed for similar actuation when used with other types of controls, such a member or means is not here illustrated.

The rod 33 interiorly of the guide 34 is provided with a collar or cylindrical flange 35 which provides an abutment for one end of a compression spring 36, the other end of which abuts against the inturned edge of the adjacent end of the guide 34 so that the conically-shaped member 32 is normally retained in its retracted position, as shown in Fig. 1, but may be moved forwardly therefrom by a thrust exerted upon the outer end of the rod 33. Adjacent the rear end of the conically-shaped member 32, the guide 34 is provided with a washer or collar 37, which is preferably formed of insulating material and is adapted to engage the under surface of the member 19 so that the cam-shaped surface 31 of that member is prevented from engaging the member 32 when the latter is in its retracted position, see Fig. 1.

One lead 38 of the electromagnet 25 is preferably connected to the U-shaped member 11 and the latter is provided with a terminal member 39 projecting outwardly, that is, to the right of the supporting plate 10, a bushing such as 40 surrounding the portion of this terminal member intermediate the member 11 and the plate 10 so that the terminal and bushing also assist in properly positioning and supporting the member 11 upon the plate 10. The other lead 41 of the electromagnet 25 is electrically connected to the member 19 as by soldering, or the like.

An electrical condenser 42 is supported by the substantially horizontal portion of the U-shaped member 11. This condenser has one terminal 43 electrically connected with the member 11 and the other terminal connected by a lead wire 44 to the member 19. The guide member 34 constitutes a second terminal for the regulator and is conductively associated with the member 32 in the preferred embodiment by virtue of the member 32, rod 33 and guide 34 all being constructed of metal. It will be apparent, however, that the rod 33 may be formed of conductive material other than metal or of insulating material, if desired, and if insulating material be used the guide 34 and member 32 may be electrically connected by a flexible lead or other expedient.

In employing the speed controller or regulator of this invention, the motor M, whose speed is to be controlled, has one lead 45 thereof connected with a power supply line L1. The other lead 46 of the motor is then connected to the terminal 39 of the controller and the power supply line L2 is connected with the guide member 34 of the controller. With the parts of the controller in their positions as shown in the drawing, which corresponds to the non-operating position of the controller and of the motor, the circuit to the motor is interrupted and the electromagnet 25 is not energized.

When it is desired to operate the motor, the operator pushes inwardly on the rod 33. This moves the conically-shaped member 32 to the left, as viewed in Fig. 1, engaging it with the cam-shaped surface 31 of the member 19. The initial engagement of the member 32 and the portion 31 completes a circuit from one side of the power supply through L2, guide 34, rod 33, members 32 and 19, and lead 41 to the electromagnet 25. This circuit is completed from the other lead 38 of the electromagnet through member 11, and terminal 39 to the motor lead 46, thence through the motor windings and the lead 45 to the other power supply line L1. Consequently, the electromagnet 25 is energized so that the armature 16 and contact carrying member 17 are attracted towards the portions 13 and 27 of the pole pieces.

When the power supply employed for the motor M is of the alternating current type, the cyclic reversals of the current cause the armature 16 and the contact arm 17 to be rapidly repeatedly vibrated. Therefore, the contact 23 carried by the member 17 is rapidly periodically moved towards and away from the contact 30. The separation between these contacts at the time of initial engagement of the conical members 32 with the cam surface 31 is preferably such that the vibratory movement of the contact 23 does not have sufficient amplitude to effect engagement of that contact with the contact 30. The impedance of the winding of the electromagnet 24 is preferably such that the voltage drop therethrough, when the impedance is in series with the motor M, is such that the latter does not operate. If the operator pushes further upon the rod 33, however, the conical member 32 now in engagement with the cam portion 31 of the member 19 moves the latter and its contact 30 further in the direction of the contact 23. When low speed operation of the motor is desired, the movement of the rod 33 is such that the member 19 is positioned so that the contacts 23 and 30 are engaged during each vibration of the armature 16 for an interval of very short duration.

The engagement of the contacts 23 and 30 short-circuits the coil of the electromagnet 25 so that during the time the contacts 23 and 30 are in engagement, the motor M is supplied with an impulse of electrical power at full line voltage, the circuit then extending from L2 through the members 34, 33, 32, 19, contacts 30, 23, and the member 11 to the terminal 39, thence to and through the motor and to the power supply line L1. The frequency of these impulses of full line voltage is of course the same as the frequency of vibration of the armature 16 which is selected, as above described, by suitable selection of the dimensions and characteristics of the various elements of the device. Consequently, the motor M is operated at a speed depending upon the duration of the intervals when the contacts 23 and 30 momentarily touch during each vibration. The selected speed may be extremely low but the motor is, nevertheless, operated at substantially its full power due to the rapidity of the impulses, which may be in the order of from 600 to 900 per minute, and the fact that they are at full line voltage. When higher speeds are desired, the rod 33 is positioned further to the left as viewed in Figs. 1 and 2, so that the duration of engagement of the contacts 23 and 30, during each vibration of the former, is lengthened with the result that the motor M receives full line voltage impulses of correspondingly longer duration and hence operates at higher speeds.

The controller is so constructed that the rod 33 may be moved far enough so that the contacts 23 and 30 are in continuous engagement and, consequently, the motor M is then operated at full speed and at full line voltage, since the impedance of the electromagnet 25 is continuously short-circuited. The speeds of the motor may be readily varied from zero to maximum by simply actuating the rod 33 and at all speeds the motor is energized by impulses of full line voltage so that it operates at substantially its full power regardless of the selected speed.

When pressure is removed from the rod 33, the spring 36 returns the latter to the position shown in Figs. 1 and 2 so that the member 19 rests upon the washer or collar 37, thereby interrupting the engagement between the cam surface 31 and the conically-shaped member 32 with the result that the circuit to the electromagnet and the motor is broken. It is evident, therefore, that the circuit controller also provides an "off-on" switch, as well as effecting selection of the speed of the motor.

It will be observed that the circuit controller of this invention is such that, while the motor M is energized by rapid impulses of electrical power at full line voltage, the circuit to the motor is not completely opened when the contacts 23 and 30 separate since the impedance of the electromagnet remains in the circuit in series with the motor. This greatly reduces sparking between the contacts 23 and 30, and the condenser 40, which is bridged across the contacts, further reduces or entirely eliminates any sparking at the contacts 23 and 30, thereby reducing or substantially eliminating radio disturbance and lengthening the life of the contacts. If desired, this condenser may be omitted without altering the operation of the device except for a possible slight sparking at the contacts.

While the circuit controller of this invention has been particularly described with respect to its use in conjunction with alternating current, it will be apparent that the device is not limited to use with electrical power of that type but may be readily employed with direct current. This is due to the fact that, when the contacts 23 and 30 are in engagement, the coil of the electromagnet 25 is short-circuited, and hence the armature 16 would be returned to its upper position by the resiliency thereof whether the device is employed with direct or alternating current and no separate make-and-break is necessary for use with direct current.

Furthermore, the impedance in series with the motor need not be the coil of the electromagnet but may be a separate element across which the contacts 23 and 30 are bridged, the electromagnet then being utilized solely to operate the contacts. Moreover, the impedance in such cases may be a non-inductive resistance.

Hence, the term "impedance" as used throughout the description and claims of this application is employed, and is intended to be construed, in its generic sense to include both resistance plus inductance or simply a non-inductive resistance since it is obvious that the equation for an inductive circuit:

$$I = \frac{E}{\sqrt{R^2 + {}^2L\omega^2}}$$

reduces to $$I = \frac{E}{R}$$

when $\omega=0$, i. e., the electromotive force is not varying, or when $L=0$, i. e., the circuit is non-inductive (see page 236 of Gilbert, "Electricity and Magnetism"; 1932 edition).

It will be readily understood that the novel circuit controller or regulator may be provided with a suitable housing or casing, which has not here been illustrated for the purpose of simplification and to more clearly show the operating features of the mechanism. Likewise, various details of the construction may be modified or altered by one skilled in the art after having had the advantage of this disclosure without departing from the spirit of the invention and, consequently, the detailed description and illustration should be understood as illustrative only of the present preferred embodiment of the device and not as a limitation upon the invention.

Having thus described the invention, I claim:

1. A speed controller for an electric motor comprising a pair of contacts, means supporting one of said contacts for repeated movement to and from engagement with the other of said contacts, means independent of said motor for rapidly moving said one contact with periodic regularity at a speed independent of said motor speed, the last mentioned means including an impedance, means adapted to connect said contacts in parallel with said impedance and in series with said motor and a source of electrical power, and means to adjust the position of the other of said contacts relative to said one contact during operation of the controller to thereby vary the duration of closing of the contacts, whereby the periodic closing of said contacts energizes the motor with pulses of electrical power at full line voltage and the speed of the motor is determined by the duration of said pulses.

2. A speed controller as defined in claim 1 and further comprising manually operable switch means in series with said source of electrical power and said contacts, and a single manually operable means cooperating with said other contact and said switch means for sequentially effecting actuation of said switch means and controlling the position of said other contact.

3. A speed controller for an electric motor comprising an electromagnet, a movable armature for said electromagnet, an electrical contact mounted for movement with said armature, a second electrical contact adapted to be engaged by said first contact when the latter is moved to one position by energization of said electromagnet, the said contacts being adapted to be disengaged by movement of said armature and first contact to a second position when said electromagnet is deenergized, means adapted to connect the said electromagnet in series with the motor to be controlled and a source of electrical power, and means connecting said contacts in parallel with said electromagnet, whereby the said contacts are repeatedly opened and closed with each closing of the said contacts short circuiting the said electromagnet so that the motor is energized by pulses of electrical energy at substantially full line voltage.

4. A speed controller for an electric motor comprising an electromagnet, a movable armature for said electromagnet, an electrical contact mounted for movement with said armature, a second electrical contact adapted to be engaged by said first contact when the latter is moved to one position by energization of said electromagnet, the said contacts being adapted to be disengaged by movement of said armature and first contact to a second position when said electromagnet is deenergized, means adapted to connect the said electromagnet in series with the motor to be controlled and a source of electrical power, means connecting said contacts in parallel with said electromagnet, and means to adjust the position of said second contact relative to said first contact, whereby the said contacts are repeatedly opened and closed with each closing of the said contacts short circuiting the said electromagnet so that the motor is energized by pulses of electrical energy at substantially full line voltage and the speed of the motor is determined by the duration of engagement of the contacts.

5. A speed controller for an electric motor comprising an electromagnet, an armature for said electromagnet supported for vibratory movement in response to energization and deenergization of said electromagnet, an electrical contact mounted for movement with said armature, a second contact adapted to be engaged by said first contact when the latter is vibrated, means adapted to connect the said electromagnet in series with the motor to be controlled and a source of electrical power, means connecting said contacts in parallel with said electromagnet, and means to adjust one of said contacts relative to the other contact to vary the duration of their engagement, whereby the said contacts are repeatedly opened and closed with each closing of the said contacts short circuiting the said electromagnet so that the motor is energized by pulses of electrical energy at substantially full line voltage and the speed of the motor is determined by the duration of engagement of the contacts.

6. A speed controller as defined in claim 5 and further comprising means to dampen the vibration of said armature and thereby control the frequency of the pulses of full line voltage supplied by the controller.

7. A speed controller as defined in claim 5 and in which the said armature is supported as a cantilever.

8. A speed controller as defined in claim 5 in which the said armature comprises a plate-like spring having a central opening, and a tongue-like member connected with said armature and projecting into the said opening with the first-mentioned contact mounted on said tongue-like member adjacent the free end thereof.

9. A speed controller for an electric motor comprising an electromagnet, an armature for said electromagnet at least a portion of which is resilient and is so supported that the armature vibrates in response to energization and deenergization of said electromagnet, an electrical contact mounted for movement with said armature, an adjustable contact movable towards and away from said first-mentioned contact and adapted to be engaged by said first contact when the latter is vibrated, the range of adjustability of said adjustable contact including a position thereof in which the contacts remain in continuous engagement, means adapted to connect the said electromagnet in series with the motor to be controlled and a source of electrical power, and means connecting said contacts in parallel with said electromagnet, whereby the said contacts are adapted to be repeatedly opened and closed with each closing of the said contacts short circuiting the said electromagnet so that the motor is energized by pulses of electrical energy at substantially full line voltage and the speed of the motor is determined by the duration of the intervals in which the said contacts remain closed, the motor being continuously energized when the said adjustable contact is positioned to continuously engage said first contact.

10. A speed controller for an electric motor comprising an electromagnet, an armature for said electromagnet supported for vibratory movement in response to energization and deenergization of said electromagnet, an electrical contact mounted for movement with said armature, a second electrical contact adapted to be engaged by said first contact when the latter is vibrated, means adapted to connect the said electromagnet in series with the motor to be controlled and a source of electrical power, means connecting said contacts in parallel with said electromagnet, means to adjust said second contact relative to said first contact and thereby regulate the duration of engagement of said contacts during each vibration of said first contact, the last-mentioned means including a manually movable member and cooperating cam surfaces for transmitting movement of said member to said adjustable contact.

11. A speed controller as defined in claim 10 and further comprising means normally urging said member to a position in which the said cam surfaces are disengaged, and means electrically connecting said cam surfaces in series with the said electromagnet and motor so that the said cam surfaces constitute a switch which is closed by the initial engagement of the said cam surfaces.

12. A speed controller for an electric motor comprising a mounting plate, an electromagnet mounted on said plate, an armature for said electromagnet, means connected to said plate and providing a cantilever-type support for said armature whereby vibratory movement is imparted to said armature and supporting means in response to energization and deenergization of said electromagnet, an electrical contact carried by said armature supporting means for vibratory movement therewith, a second electrical contact, electrical conductive means supporting said second contact upon said plate in line with the path of movement of said first contact, a member movably supported upon said plate and adapted to be moved relative thereto into engagement with the supporting means for said second contact to move the latter towards said first contact, the portion of said member which engages said contact supporting means being electrically conductive, force exerting means normally urging said movable member out of engagement with said contact supporting means, a first electrical terminal member conductively associated with the conductive portion of said movable member, and a second electrical terminal member connected with said first contact and one lead of said electromagnet, the other lead of said electromagnet being connected to the supporting means for said second contact, whereby a motor connected in series with said terminal members and a source of electrical power is energized at full line voltage at any desired speed by movement of said movable member against the action of said force exerting means, the speed of the motor being selected by the extent of said movement of the movable member, and the motor being deenergized when the movable member is allowed to return to its initial position under influence of said force exerting means.

13. A speed controller as defined in claim 12 and further comprising a substantially U-shaped magnetically permeable member having one leg connected to said plate and the other leg spaced therefrom, the said electromagnet being supported upon said U-shaped member in a manner such that the said other leg thereof constitutes one pole piece for the electromagnet, the said armature supporting means having one end connected with said one leg of the U-shaped member and extending transversely therefrom so that the said armature has a portion thereof disposed adjacent the said other leg of the U-shaped member.

14. A speed controller as defined in claim 13 and further comprising a condenser mounted upon said U-shaped member and electrically bridged about the said contacts.

15. A speed controller for an electric motor comprising an electromagnet, a movable armature for said electromagnet, an electrical contact mounted for movement with said armature, a second electrical contact adapted to be engaged by said first contact when the latter is moved to one position by energization of said electromagnet, the said contacts being adapted to be disengaged by movement of said armature and first contact to a second position when said electromagnet is deenergized, means adapted to connect the said contacts in series with the motor to be controlled and a source of electrical power, and means to connect said electromagnet with a source of electrical power so that the electromagnet is repeatedly energized and deenergized, whereby the said contacts are repeatedly opened and closed with each closing of the said contacts supplying a pulse of electrical energy to said motor at substantially full line voltage.

16. A speed controller as defined in claim 15 and further comprising means to adjust the position of said second contact relative to the first-mentioned contact to thereby vary the duration of closing of the contacts during each engagement thereof and correspondingly vary the speed of the motor.

17. A speed controller for an electric motor comprising an electromagnet, a pair of contacts connected in parallel with said electromagnet, means supporting one of said contacts for movement to and from engagement with the other of said contacts with periodic regulation in response to repeated energization and deenergization of said electromagnet, and means adapted to connect said contacts in series with said motor and a source of electrical power, whereby repeated energization and deenergization of said electromagnet effects periodic closing of said contacts so that the motor is energized with pulses of electrical power at full line voltage and the speed of the motor is determined by the duration of said pulses.

NATHANIEL E. COLEGROVE.

REFERENCES CITED

The following references are of record in the file of this patent:

UNITED STATES PATENTS

| Number | Name | Date |
| --- | --- | --- |
| 720,729 | McDonnell | Feb. 17, 1903 |
| 892,656 | Eaker | July 7, 1908 |
| 1,577,618 | Ford | Mar. 23, 1926 |
| 2,113,234 | Lee | Apr. 5, 1938 |
| 2,281,711 | Peck et al. | May 5, 1942 |
| 2,293,996 | Naul | Aug. 25, 1942 |
| 2,357,285 | Potts | Sept. 5, 1944 |
| 2,520,492 | Colegrove | Aug. 29, 1950 |